(12) United States Patent
Gresset et al.

(10) Patent No.: US 10,813,293 B2
(45) Date of Patent: Oct. 27, 2020

(54) ROUND BALER PRESS ROLL WITH A UNIFORM CYLINDRICAL PORTION

(71) Applicant: DEERE & COMPANY, Moline, IL (US)

(72) Inventors: Pascal Gresset, Auxon Dessous (FR); Frederic Perrotin, Le Tremblois (FR); Sébastien Guillemot, Pesmes (FR)

(73) Assignee: DEERE & COMPANY, Moline, IL (US)

( * ) Notice: Subject to any disclaimer, the term of this patent is extended or adjusted under 35 U.S.C. 154(b) by 200 days.

(21) Appl. No.: 16/011,804

(22) Filed: Jun. 19, 2018

(65) Prior Publication Data

US 2019/0014725 A1    Jan. 17, 2019

(30) Foreign Application Priority Data

Jul. 12, 2017  (EP) .................................... 17181018

(51) Int. Cl.
*A01F 15/18* (2006.01)
*A01F 15/07* (2006.01)
(Continued)

(52) U.S. Cl.
CPC .......... *A01F 15/18* (2013.01); *A01F 15/0715* (2013.01); *A01F 15/106* (2013.01);
(Continued)

(58) Field of Classification Search
CPC .... A01F 15/18; A01F 15/0715; A01F 15/106; A01F 15/07; A01F 15/071; A01F 15/141; A01F 15/145; A01F 2015/0755; A01F 2015/077; A01F 2015/186; A01F 2015/079; A01F 2015/072; A01F 2015/0725; A01F 2015/0745
See application file for complete search history.

(56) References Cited

U.S. PATENT DOCUMENTS

| | | | |
|---|---|---|---|
| 4,788,900 A * | 12/1988 | Berkers ................... | A01F 15/07 100/88 |
| 2010/0236190 A1 * | 9/2010 | Paillet .................. | A01F 15/0715 53/203 |

(Continued)

FOREIGN PATENT DOCUMENTS

| | | |
|---|---|---|
| DE | 102011010251 A1 | 8/2012 |
| WO | 2011018455 A1 | 2/2011 |

OTHER PUBLICATIONS

European Search Report issued in counterpart application No. 17181018.7 dated Jan. 22, 2018. (6 pages).

*Primary Examiner* — Alicia Torres
*Assistant Examiner* — Adam J Behrens

(57) ABSTRACT

A round baler for forming a bale of residual product includes a baling chamber, a plurality of press rolls mounted within the baling chamber, and at least one driving bar associated with at least one of the plurality of press rolls. The driving bar extends at least partially along the length of at least one of the plurality of press rolls. The round baler further includes at least one cylindrical portion defined partially along the length of the at least one of the plurality of press rolls. The at least one cylindrical portion is arranged to compensate for a radial extension of the at least one driving bar to define a uniform surface.

8 Claims, 6 Drawing Sheets

(51) Int. Cl.
*A01F 15/14* (2006.01)
*A01F 15/10* (2006.01)

(52) U.S. Cl.
CPC .......... *A01F 15/071* (2013.01); *A01F 15/141* (2013.01); *A01F 2015/077* (2013.01); *A01F 2015/0755* (2013.01); *A01F 2015/186* (2013.01)

(56) References Cited

U.S. PATENT DOCUMENTS

| | | | |
|---|---|---|---|
| 2010/0236191 A1* | 9/2010 | Paillet | A01F 15/0715 53/210 |
| 2012/0204735 A1* | 8/2012 | Claeys | A01F 15/0715 100/5 |
| 2016/0000014 A1* | 1/2016 | Dutertre | A01F 15/085 100/89 |
| 2017/0020076 A1* | 1/2017 | Dutertre | B08B 1/005 |

* cited by examiner

ROUND BALER PRESS ROLL WITH A UNIFORM CYLINDRICAL PORTION

RELATED APPLICATIONS

This application claims priority to European Patent Application Ser. No. 17181018.7, filed Jul. 12, 2017, the disclosure of which is hereby incorporated by reference in its entirety.

FIELD OF THE DISCLOSURE

The present disclosure relates to a round baler, and in particular, to a wrapping arrangement of balers and to an arrangement for efficient wrapping of bales with a wrap material.

BACKGROUND

A baler includes a baling chamber where the agricultural residues from the farm are collected for binding and forming bales. The baler includes a plurality of press rolls which are transversely positioned within the baler. Typically, the bales are bound inside the bale forming chamber before being discharged on the ground. The binding operation is typically carried out by wrapping a twine spirally around the exterior of the bale. The wrapping of the twine is controlled by a twine guiding member which is displaceable transversely in the direction of the travel of the baler in front of the opening for feeding crop material into the bale forming chamber. The end of the twine is caught by the rotating bale in the chamber and is withdrawn from a storage compartment such as a twine box provided on the chassis of the baler. Due to the transverse displacement of the guiding member, the twine forms helical turns around the bale to ensure binding over the entire length of the bale.

In order to effectively press the agricultural residues, the press rolls are provided with bars along the length thereof. The twines to be wrapped around the bales are dispensed proximate to the press rolls. The bars mounted on the press rolls tend to hold on to the twine, thereby causing the twine to be wrapped around the press rolls instead of wrapping around the bales. This causes inefficient operation of the baler and also causes dissatisfaction to the operator.

Hence, there is a need for a round baler with an arrangement to ensure efficient wrapping of the bales with twines in order to prevent the twines from wrapping around the press rolls.

SUMMARY

The present disclosure provides one or more embodiments designed to prevent wrapping of the twines around a press roll of a baler while ensuring wrapping of the bales by the twines, thereby, increasing efficiency of the baler.

In one embodiment of the present disclosure, a round baler includes a baling chamber, a plurality of press rolls mounted within the baling chamber, and at least one driving bar associated with at least one of the plurality of press rolls. The driving bar extends at least partially along the length of at least one of the plurality of press rolls.

The round baler may include at least one cylindrical portion defined partially along the length of the at least one of the plurality of press rolls. The at least one cylindrical portion is arranged to compensate a radial extension of the at least one driving bar, thereby defining a uniform surface.

The round baler further comprises a wrapping material insertable into the baling chamber proximate to the at least one of the plurality of press rolls, wherein the insertion takes place close or approximate to the cylindrical portion. The cylindrical portion restricts wrapping of the wrapping material around the at least one of the plurality of press rolls.

The round baler further includes a scraper element functionally disposed proximate to at least one of the plurality of press rolls. The scraper element defines a scraping edge extending along the length of one of the plurality of press rolls. The cylindrical portion is arranged to define a minimized gap between the scraping edge and the at least one of the plurality of press rolls. The minimized gap restricts wrapping of the wrapping material around at least one of the plurality of press rolls.

The wrapping material is a twine. A dispensing arm is positioned functionally proximate to the cylindrical portions of the at least one of the plurality of press rolls when inserting the twine. Although one embodiment is described using a twine as wrapping material, providing a cylindrical portion on the press roll at the insertion area for wrapping material may also be beneficial when using net as wrapping material in order to avoid curling of the net around the respective press rolls.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
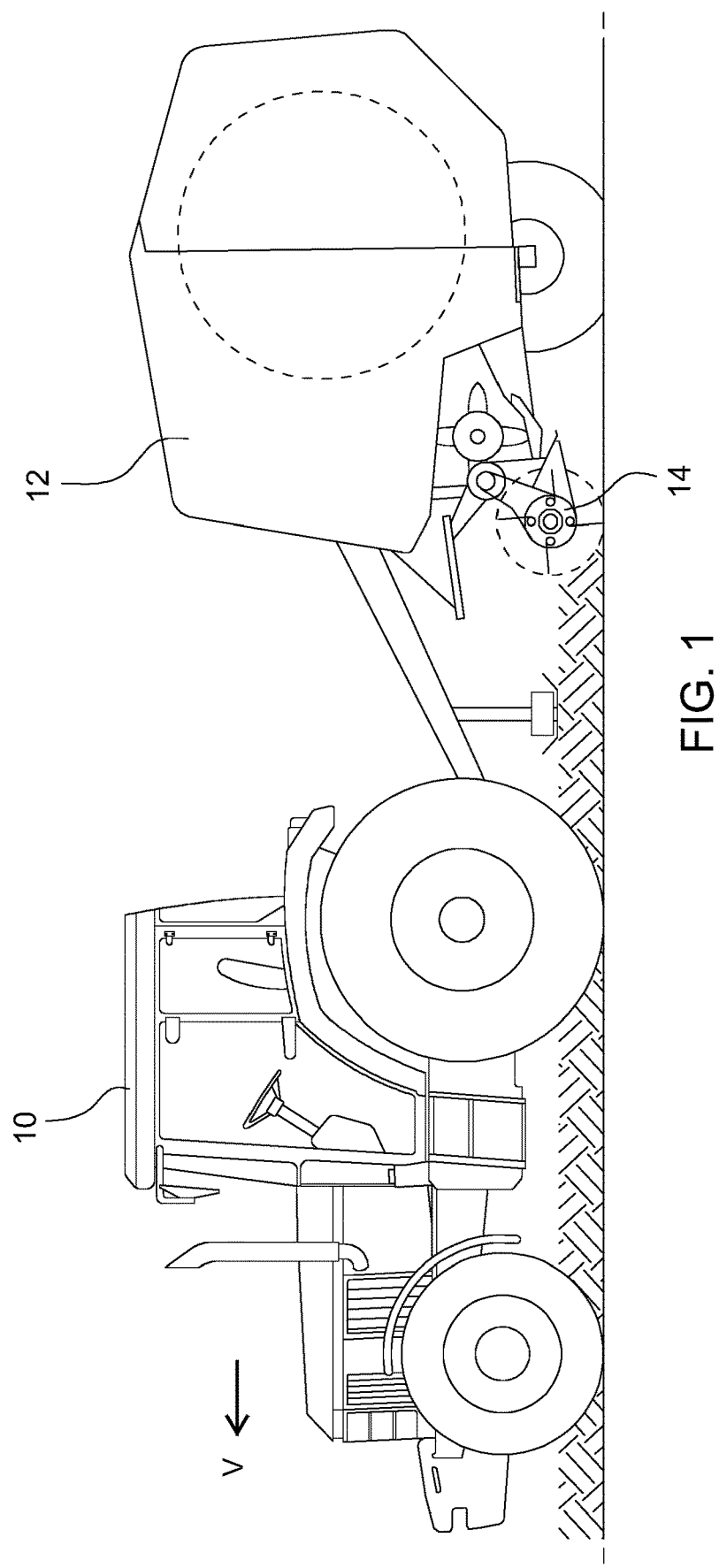
FIG. 1 illustrates a round baler towed by a tractor.
Figure 2:
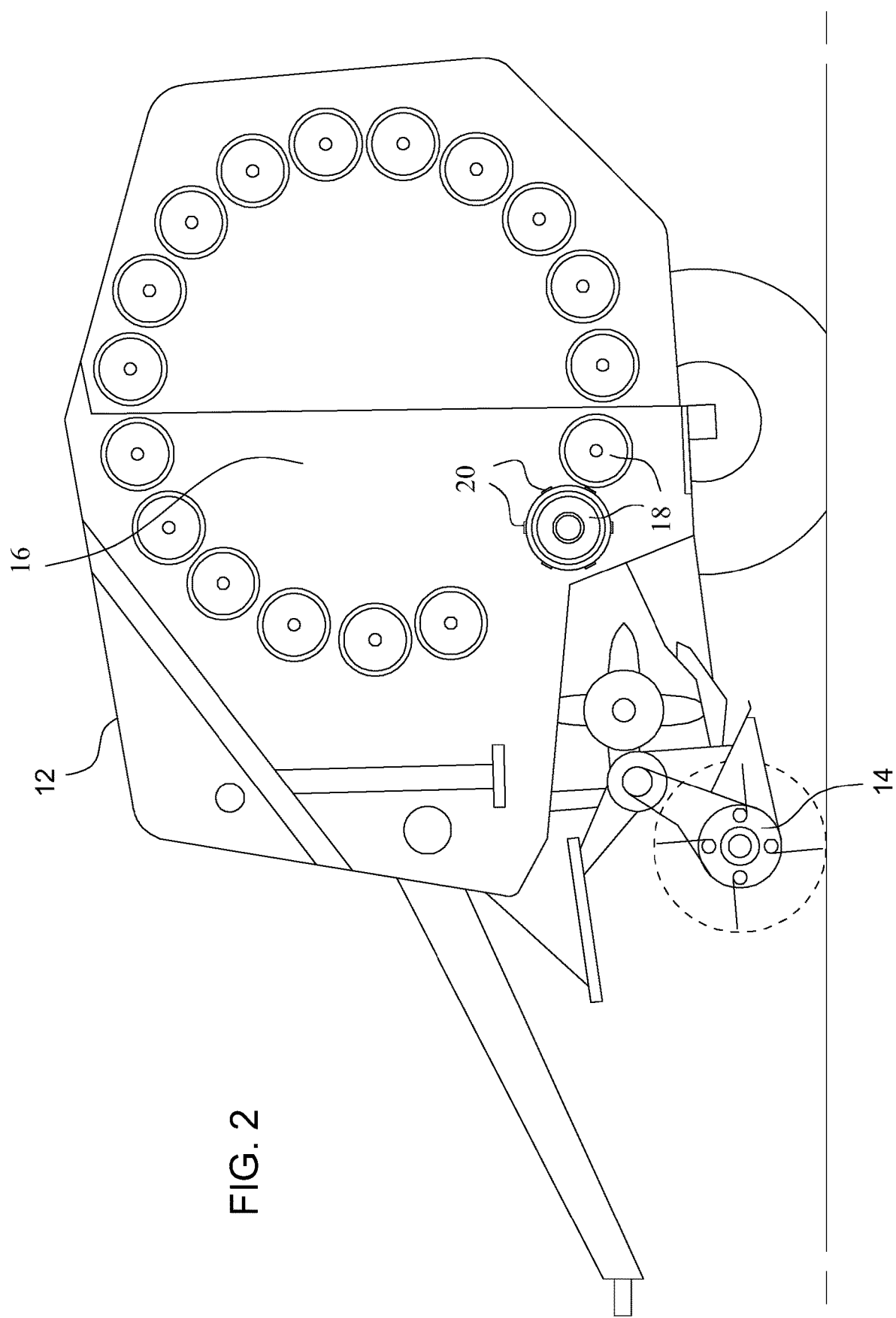
FIG. 2 illustrates a sectional view of the round baler with a plurality of press rolls, in accordance with the present disclosure.

Referring to FIG. 1 and FIG. 2, a tractor (10) is used to tow a round baler (12) along the forward towing direction (V). Hereinafter, all indicated directions and location of the round baler (12), such as, forward, backward, rear, front, up, above, down, left and right shall be determined with reference to the forward towing direction (V) of the round baler (12) in the field and is not to be understood to be limiting.

The round baler (12) includes a pick-up unit (14) provided at the front end of the round baler (12) to collect the residual product, such as hay and forage from the ground, and convey it into the baling chamber (16). The round baler (12) is mounted on a support frame of a chassis and includes the baling chamber (16) with a plurality of press rolls (18).

Figure 3:
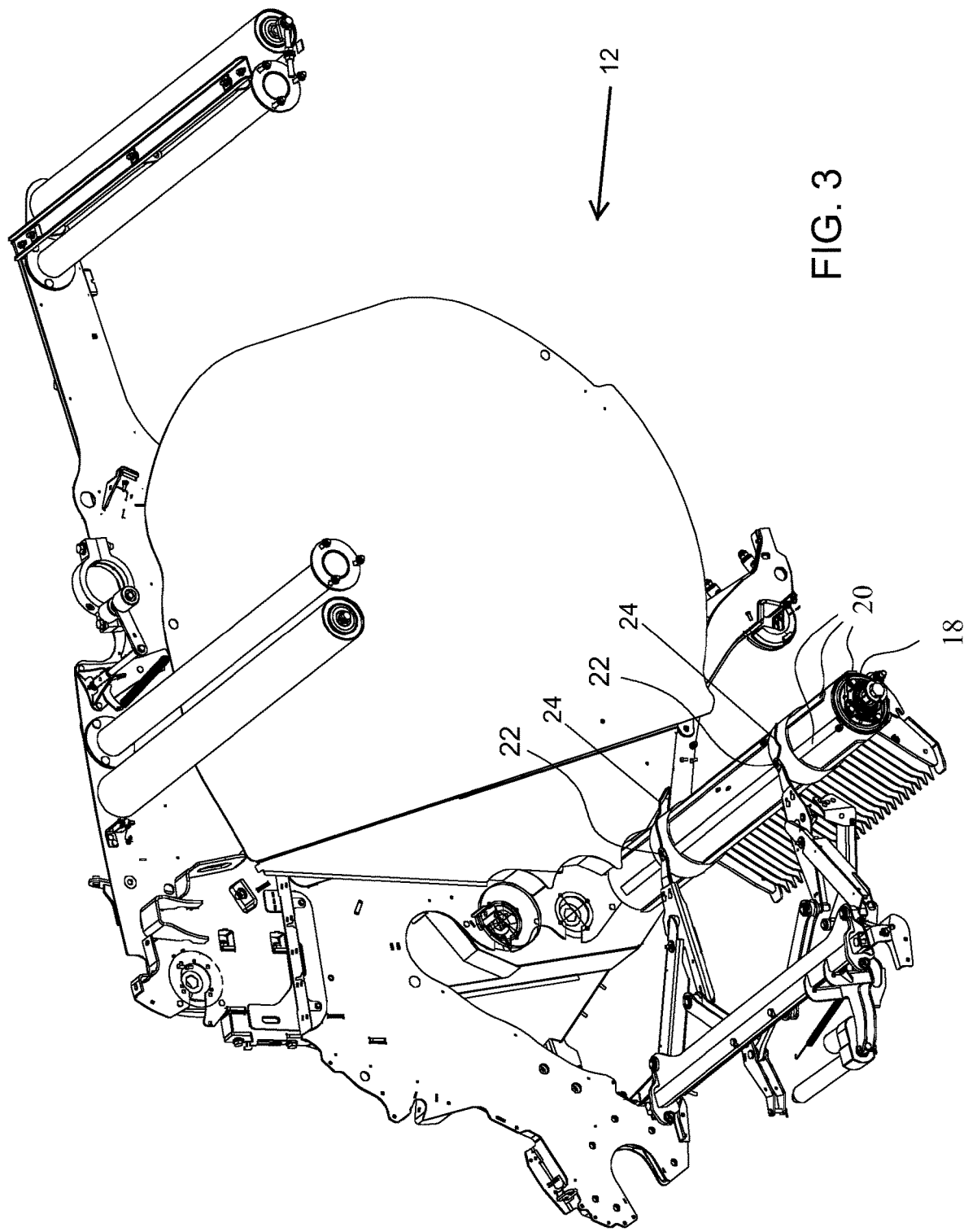
FIG. 3 illustrates details of the twine system of the round baler, in accordance with an existing arrangement.

At least one of the press rolls (18), illustrated in FIG. 3, is provided with at least one driving bar (20). The at least one driving bar(s) (20) are mounted on the press rolls (18) in a circumferentially spaced apart configuration. Each of the press rolls (18) are configured to rotate about their respective axis. The rotation of the press rolls (18) helps in bringing together the residual product, thereby enabling formation of bales. The driving bars (20) mounted on the press rolls (18) help in further agitating the residual product for efficient formation of the bales.

A twine system, having dispensing arms (22), is disposed proximate the front end of the round baler (12), such that, the press rolls (18) are disposed between the twine system and the baling chamber (16). The twine system enables dispensing wrapping material, such as, twines (24). The dispensing arms (22) extend towards a press roll (18) proximate to an insertion place (23) and dispenses twines (24) for wrapping a bale formed in the baling chamber (16). The twines (24) are insertable into the baling chamber (16), proximate to the at least one of the plurality of press rolls (18) proximate to the insertion place (23). As the press rolls (18) rotates, the twines (24) moves along the surface of the press rolls (18) towards the baling chamber (16).

Figure 4:
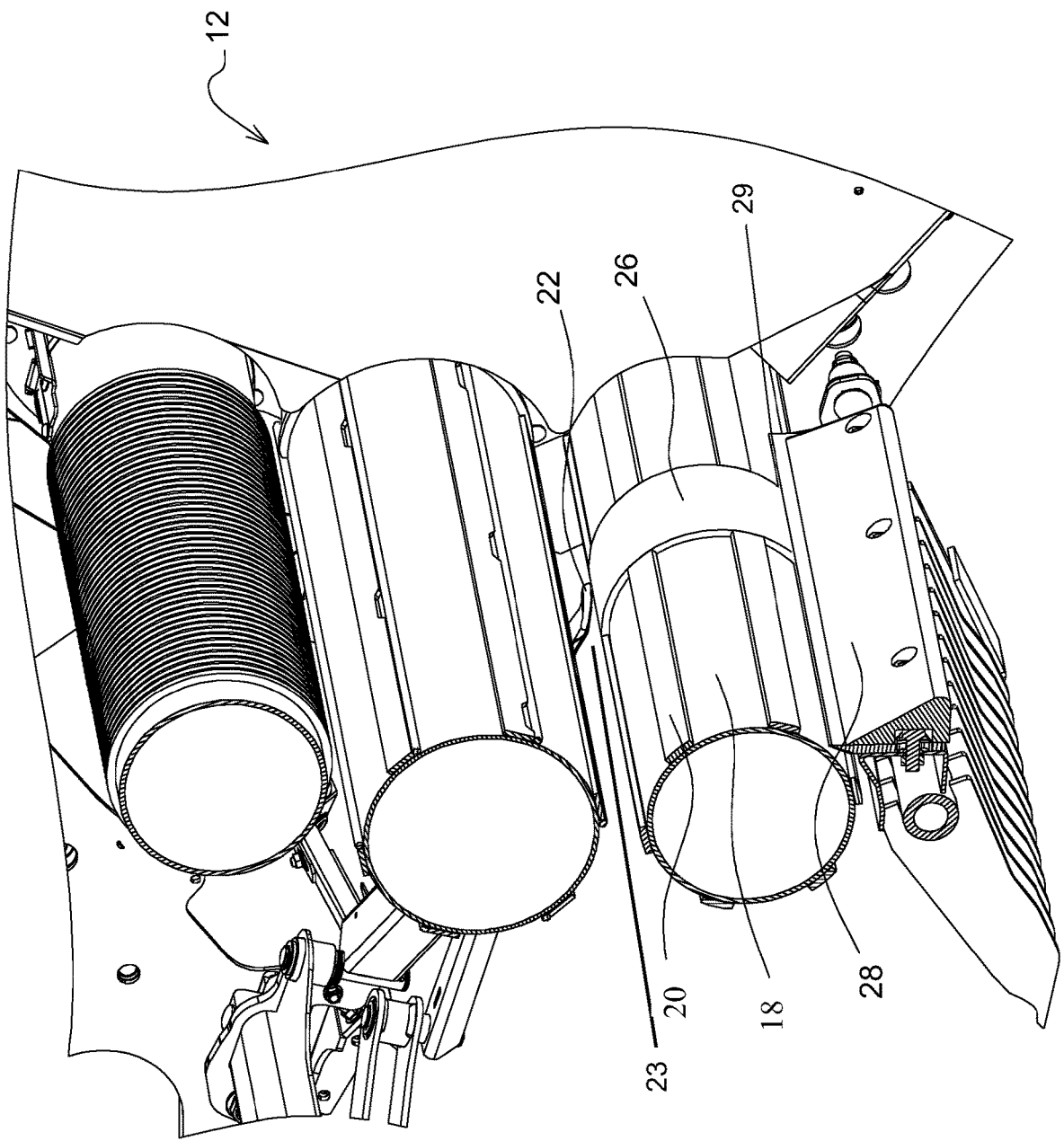
FIG. 4 illustrates a perspective rear view of the press rolls and scraper element in accordance with the present disclosure.

A scraper element (28), illustrated in FIG. 4, is functionally disposed proximate to the one of the plurality of press rolls (18) proximate to the insertion place (23). The scraper element (28) defines a scraping edge (29) which extends along the length of the press roll (18) proximate to the insertion place (23). The scraping edge (29) is spaced apart from the respective press roll (18), so as to prevent interfering with smooth rotation of the press rolls (18). Thus, a substantial gap (not particularly indicated) is defined between the scraping edge (29) and the press roll (18). The scraper element (28) is profiled to keep the roll clean from residual crop and may guide the twines (24) away from the press roll (18) towards the bale formed in the baling chamber (16).

The driving bars (20) extend at least partially along the length of at least one of the plurality of press rolls (18). The driving bars (20), for example, may be arranged on the circumference of the press rolls (18) as a plurality of arrays of the driving bars (20). The arrays of the driving bars (20) are provided along the length of the press rolls (18) in a spaced apart configuration.

Figure 5:
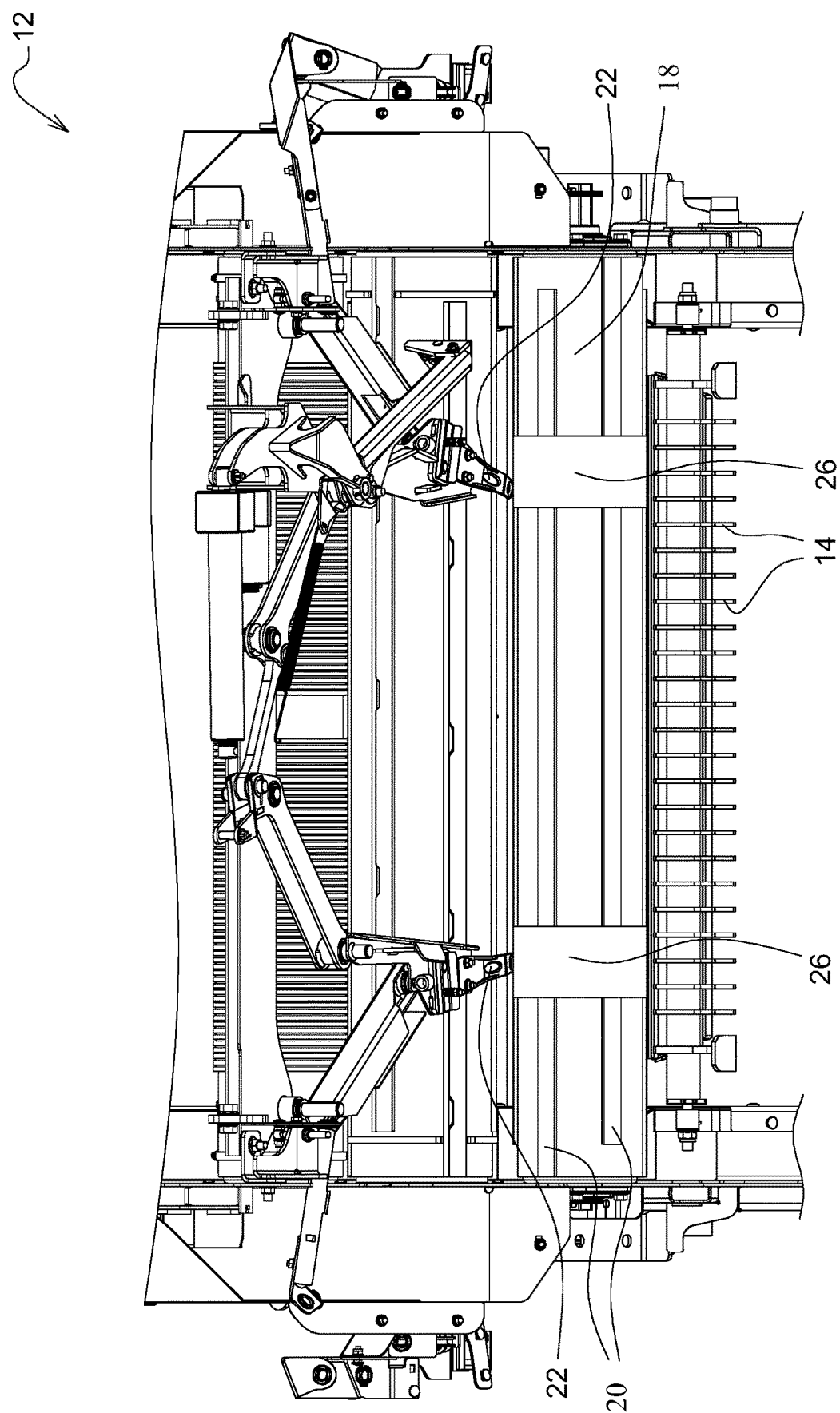
FIG. 5 illustrates a perspective front view of the press rolls, in accordance with the present disclosure, along with a twine system.
Figure 6:
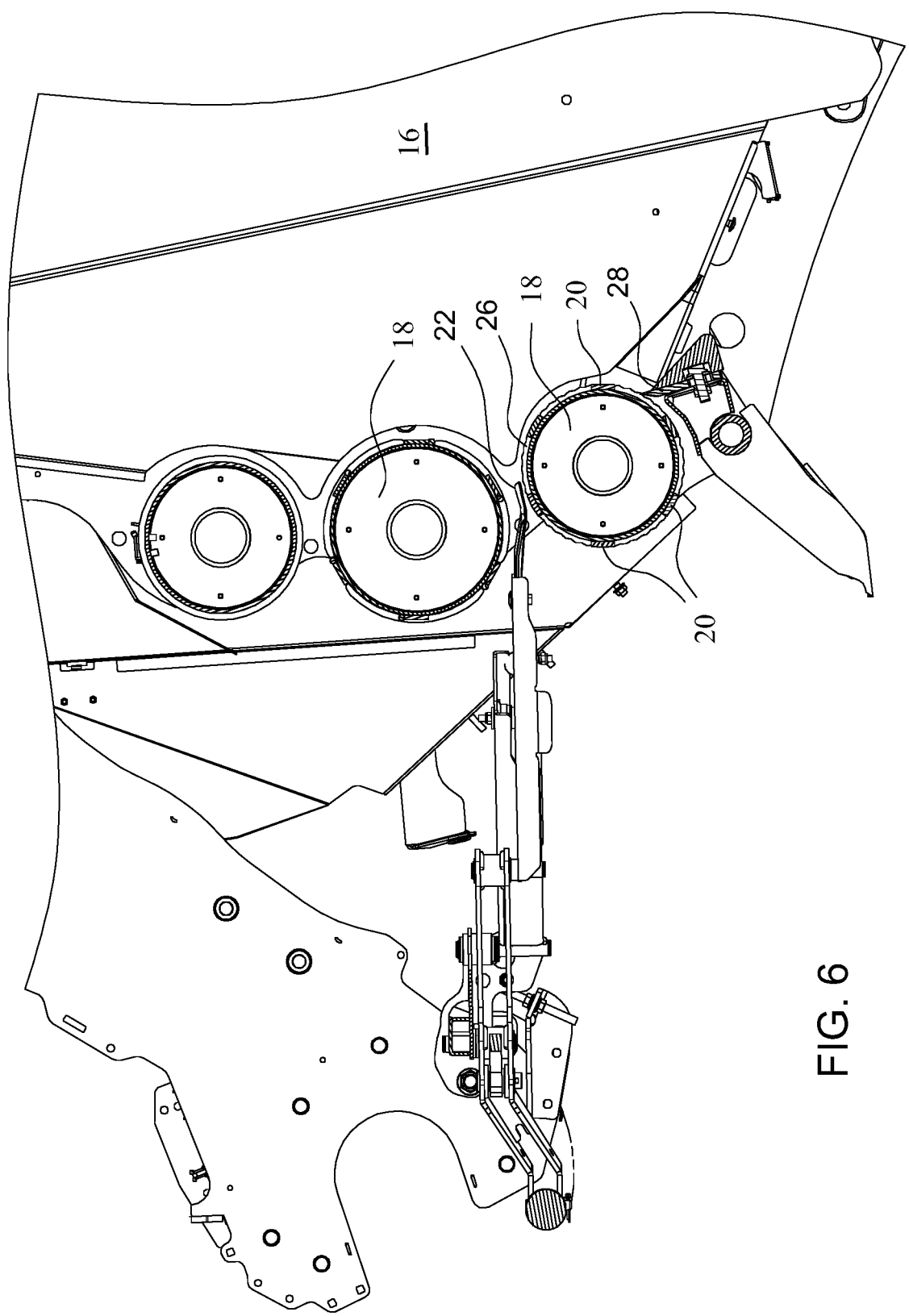
FIG. 6 illustrates side view of the press rolls, in accordance with the present disclosure, along with the twine system.

Referring to FIGS. 4-6 in accordance with the present disclosure, there is provided at least one cylindrical portions (26) defined partially along the length of the at least one of the plurality of press rolls (18). The cylindrical portions (26) are arranged on the press rolls (18) so as to compensate as a radial extension of the at least one driving bars (20), thereby, defining a uniform surface along the length press rolls (18). Thus, when the driving bars (20) are arranged as a plurality of arrays along the length of the press rolls (18), the cylindrical portions (26) are provided between the plurality of array of the driving bars (20). The cylindrical portions (26) facilitate in reducing the gap (not particularly indicated) between the press roll (18) proximate to the insertion place (23) and the scraping edge (29). The cylindrical portions (26) are arranged to define a minimized gap between the press roll (18) and the scraping edge (29). The twines (24) are dispensed from the dispensing arm (22) proximate to the insertion place (23) at the portion of the press roll (18) with the cylindrical portions (26). The minimized gap restricts wrapping of the twines (24) around the press roll (18) proximate to the insertion place (23).

In the absence of the cylindrical portions (26), the twines (24) on being dispensed onto the press rolls (18), are ideally guided to the baling chamber (16) for wrapping of the bale formed therein. However, in certain instance, the twines (24) tend be adhered to the driving bars (20). As a result, with the rotation of the press rolls (18), the twines (24) are wrapped around the press rolls (18) instead around the bale. As a result, the bale formed in the baling chamber (16) will be dropped onto the field without being wrapped.

Thus, in accordance with the present disclosure, the cylindrical portions (26), provided on the press rolls (18), guide the twines (24) onto the scraper element (28) from the press rolls (18). The scraper element (28) thereafter guides the twines (24) for wrapping the bale in the baling chamber (16). This ensures efficient wrapping of the bale with the twines (24).

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A round baler comprising:
 a baling chamber;
 a plurality of press rolls mounted within the baling chamber;
 at least one driving bar associated with at least one of the plurality of press rolls, the at least one driving bar extending at least partially along a length of the at least one of the plurality of press rolls;
 a twine system having a dispensing arm operable to insert a twine into an insertion place proximate to the at least one of the plurality of press rolls associated with the at least one driving bar;
 wherein, at least one cylindrical portion is defined partially along the length of the at least one of the plurality of press rolls, the at least one cylindrical portion being arranged to compensate a radial extension of the at least one driving bar to define a uniform surface;
 wherein the dispensing arm is positioned proximate to the at least one cylindrical portion of the at least one of the plurality of press rolls when inserting the twine into the insertion place;
 a scraper element positioned proximate to the at least one of the plurality of press rolls associated with the at least one driving bar and operable to guide the twine away from the at least one of the plurality of press rolls and into the baling chamber; and
 wherein the at least one cylindrical portion extends along the length of the at least one of the plurality of press rolls a distance operable to guide the twine around the at least one of the plurality of press rolls associated with the at least one driving bar and onto the scraper element without contacting the at least one driving bar.

2. The round baler of claim 1, wherein the scraper element defines a scraping edge extending along the length of the at least one of the plurality of press rolls.

3. The round baler of claim 2, wherein the at least one cylindrical portion is arranged to define a minimized gap between the scraping edge and the at least one of the plurality of press rolls.

4. A baler for forming a bale of residual product, comprising:
- a chassis comprising a front end and a rear end;
- a pickup unit disposed at a front end of the chassis and configured to collect the residual product;
- a baling chamber disposed proximate the pickup unit for receiving the residual product therefrom;
- a plurality of press rolls mounted within the baling chamber; and
- at least one driving bar associated with at least one of the plurality of press rolls, the at least one driving bar extending at least partially along a length of the at least one of the plurality of press rolls;
- a twine system having a dispensing arm operable to insert a twine into an insertion place proximate to the at least one of the plurality of press rolls associated with the at least one driving bar;
- wherein, at least one cylindrical portion is defined partially along the length of the at least one of the plurality of press rolls, the at least one cylindrical portion being arranged to compensate a radial extension of the at least one driving bar to define a uniform surface;
- wherein the dispensing arm is positioned proximate to the at least one cylindrical portion of the at least one of the plurality of press rolls when inserting the twine into the insertion place;
- a scraper element positioned proximate to the at least one of the plurality of press rolls associated with the at least one driving bar and operable to guide the twine away from the at least one of the plurality of press rolls and into the baling chamber; and
- wherein the at least one cylindrical portion extends along the length of the at least one of the plurality of press rolls a distance operable to guide the twine around the at least one of the plurality of press rolls associated with the at least one driving bar and onto the scraper element without contacting the at least one driving bar.

5. The round baler of claim 4, wherein the scraper element defines a scraping edge extending along the length of the at least one of the plurality of press rolls.

6. The round baler of claim 5, wherein the at least one cylindrical portion is arranged to define a minimized gap between the scraping edge and the at least one of the plurality of press rolls.

7. A round baler for forming a bale of residual product, comprising:
- a chassis comprising a front end and a rear end;
- a pickup unit disposed at a front end of the chassis and configured to collect the residual product;
- a baling chamber disposed proximate the pickup unit for receiving the residual product therefrom;
- a plurality of press rolls mounted within the baling chamber; and
- a driving bar associated with one of the plurality of press rolls, the driving bar extending at least partially along a length of the one press roll;
- a twine system having a dispensing arm operable to insert a twine into an insertion place proximate to the one press roll associated with the driving bar;
- wherein, a cylindrical portion is defined partially along the length of the one press roll, the cylindrical portion being arranged to compensate for a radial extension of the driving bar to define a uniform surface;
- wherein the dispensing arm is positioned proximate to the cylindrical portion of the one press roll when inserting the twine into the insertion place;
- a scraper element positioned proximate to the one press roll associated with the driving bar and operable to guide the twine away from the one press roll and into the baling chamber; and
- wherein the cylindrical portion extends along the length of the one press roll a distance operable to guide the twine around the one press roll associated with the driving bar and onto the scraper element without contacting the driving bar.

8. The round baler of claim 7, wherein the scraper element defines a scraping edge extending along the length of the one press roll, wherein the cylindrical portion is arranged to define a minimized gap between the scraping edge and the one press roll.

* * * * *